Aug. 1 1933.                W. C. GOSS                1,920,502
HYGROSTATIC CONTROL
Filed Nov. 6, 1930                2 Sheets-Sheet 1
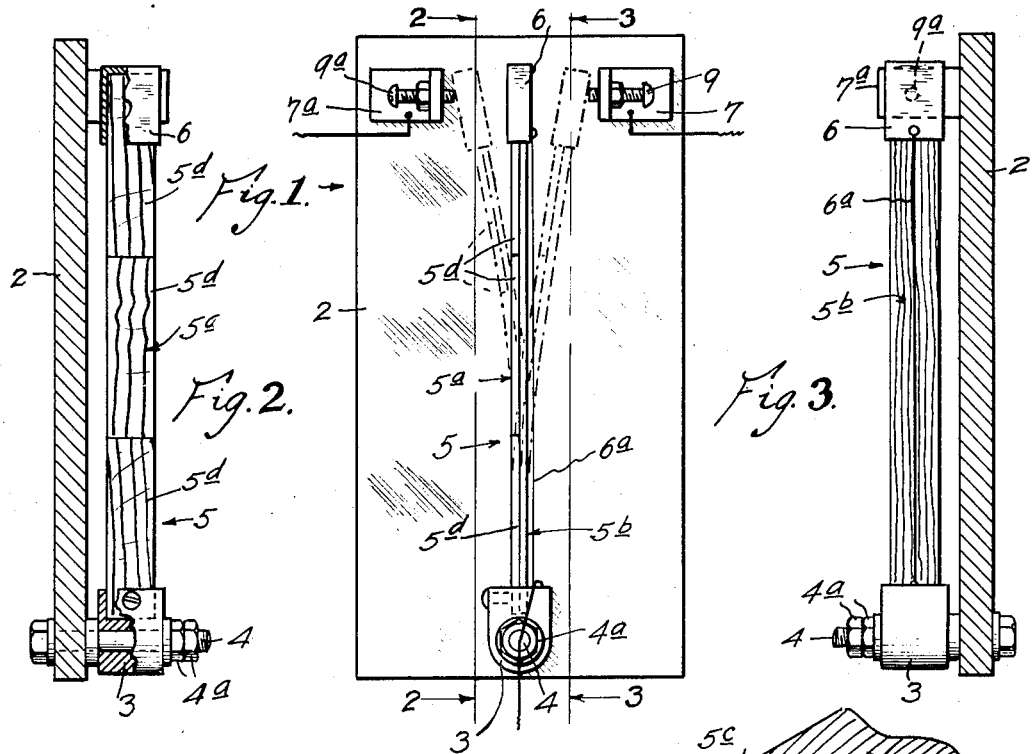
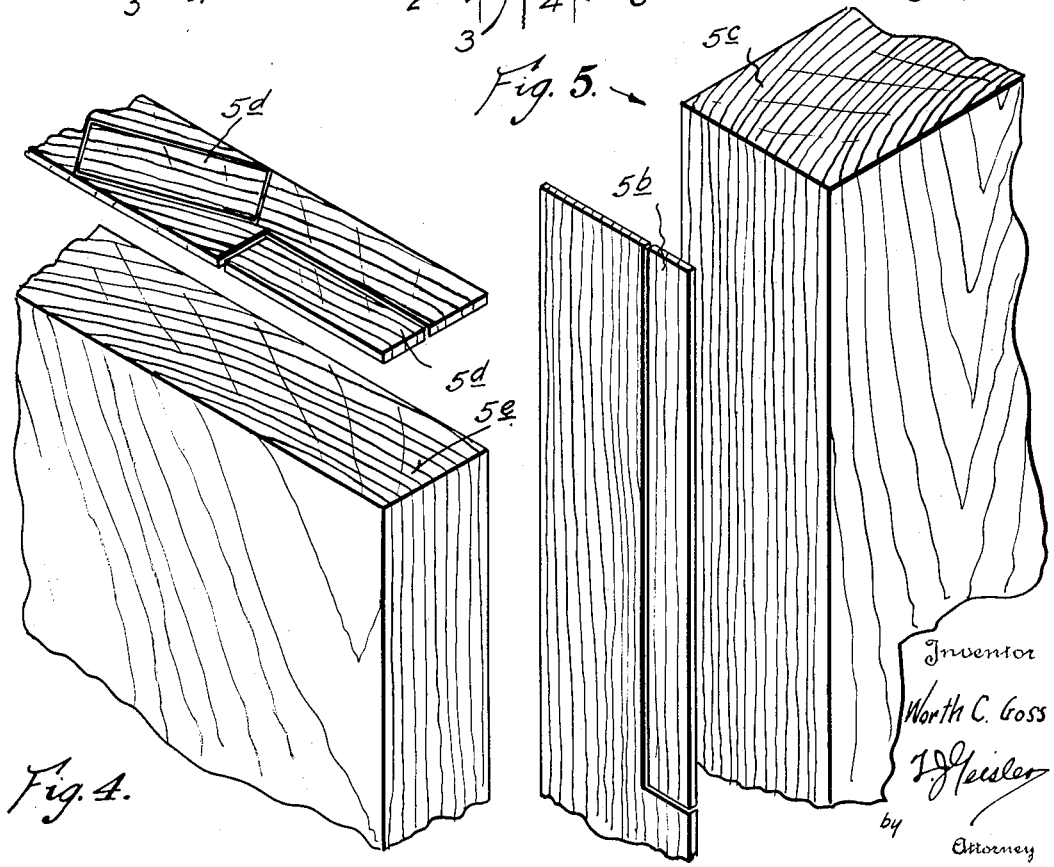

Aug. 1, 1933. W. C. GOSS 1,920,502
HYGROSTATIC CONTROL
Filed Nov. 6, 1930 2 Sheets-Sheet 2

Inventor
Worth C. Goss
by
Attorney

Patented Aug. 1, 1933

1,920,502

UNITED STATES PATENT OFFICE 1,920,502

HYGROSTATIC CONTROL

Worth C. Goss, Seattle, Wash., assignor to Humidity Control Company, Seattle, Wash., a Corporation of Washington Application November 6, 1930. Serial No. 493,804

5 Claims. (Cl. 297—1)

My invention relates to an improvement in hygrostatic control of an operable device, for example, the make-and-break of an electricity circuit.

In order to describe one practical use of my invention, I will refer to the devices used for maintaining proper humidity of the air in a room.

It is convenient to effect the proper maintenance of humidity by the generation of vapor from a vessel holding water electrically heated, but in order to do so the control of the electricity circuit must be sufficiently sensitive to variations in the humidity of the air of the room.

The object of my invention is to provide a simple, and inexpensive, hygrostatic control for that purpose which is quickly and accurately responsive to variations in humidity and which is strong and durable and will function over a long period of time without attention or adjustment.

For attaining my object I employ a container for water or other fluid, and means, preferably electric, for heating the fluid in the container, to the vaporizing temperature, and my invention resides in the novel hygrostatic control for the heating element. I propose to use as one element of the control a bar carrying one element of a make and break in the electricity circuit, said bar being normal in one position, and being caused to curve under the influence of moisture and thereby thrown into another position, relative to the other element of the make and break.

I have discovered that a bar of the character required may be simply constructed from thin strips of wood, secured together along their broad faces; one of said strips having its grain extending longitudinally, the other having its grain extending crosswise, composed of a number of abutting cross-grain segments selected from a species which tends to absorb the moisture of the atmosphere for example, maple, and thus to expand and contract lineally with the fluctuation of the moisture content of the atmosphere, and thereby cause the curving of the bar.

In order to render my hygrostatic control more sensitive, I prefer to make said bar of a series of sections connected at opposite ends in angular form, with certain of said sections consisting of strips of wood selected and joined together, as mentioned. In the latter construction of my invention, other material than wood may be used; one of the strips however must have the property of being lineally affected by moisture, whereby to cause the curving of said certain sections of the bar under the influence of moisture.

In either form of my invention, the bar of said hygrostatic control is mounted at one end, preferably by means rendering the bar radially movable, thereby to facilitate the adjustment of the bar relatively to neutral position, or with respect to the fixed element in said make and break.

It is a further object of the invention to provide, as an alternative construction, a hygroscopic element of a ladder type of construction which permits use of strips of extreme thinness and in which both sides of the strips are exposed to air, thereby rendering the element extremely sensitive and quick acting.

The complete details of my invention and its mode of operation are hereinafter fully explained with reference to the accompanying drawings.

In the drawings:

Fig. 1 shows a plan view of the controlling means of my humidizer and illustrates by broken lines how the bar curves under the influence of moisture;

Fig. 2 shows a section taken on the line 2—2 of Fig. 1 and illustrates the section of the bar composed of a strip of wood cut crosswise of the grain;

Fig. 3 shows a section taken on the line 3—3 of Fig. 1 and illustrates the section of the bar composed of a strip of wood cut longitudinally of the grain;

Fig. 4 shows a perspective view of a piece of wood and illustrates how the crosswise grain sections are cut therefrom in segments in order to render the continuity of the grain substantially uniform;

Fig. 5 shows similarly to Fig. 4 how the sections of longitudinal grain are cut from a piece of wood;

Figure 10:
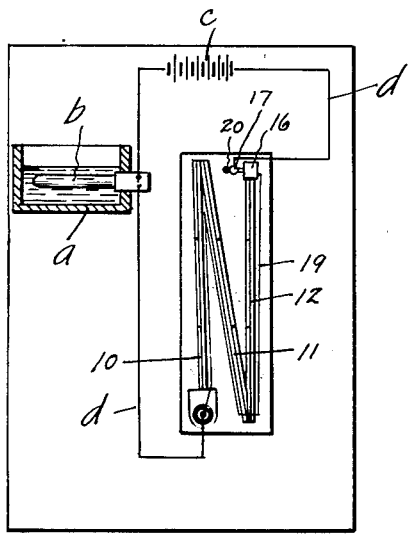
Fig. 10 shows a diagrammatic view of my humidizer and illustrates the relative arrangement of its various parts.

Referring now to the figures, and particularly to Fig. 10: My humidizer comprises an open vessel or container a for water, having a suitable electrical heating element b arranged therein. The heating element b is connected to a source of electrical energy c by a circuit d in which is connected my hygrostatic control means hereinafter to be described.

The control means comprise, referring to Figs. 1, 2 and 3, a suitable base having rotatably mounted thereon a hub 3 by means of a bolt 4, which, by tightening the nuts 4a may be secured in a given position. Carried by the hub 3 is a hygrostatic bar 5 composed of thin strips of wood 5a, 5b joined together on their broadest faces by glue or the like and provided on the other end with a suitable electrical contact 6 forming one element of a make and break switch with electrical contacts 7, 7a, carried by the said base a. The contact 6 is connected through a flexible conductor 6a with one side of the circuit d and the contact 7 is connected with the other side of the said circuit. The contacts 7, 7a are provided with set screws 9, 9a respectively, by which the relative movement of the bar 5 may be regulated.

The contact 7a may be utilized where a double circuit is required as for a dehumidizing element or the like, or may be used merely as a stop for the movement of the said bar.

The wood strip 5b of the hygrostatic bar 5 has been cut longitudinally of the grain, see Fig. 5, from wood such as a block 5c which is close grained, as western red cedar, and which when cut longitudinally of the grain is substantially unaffected by moisture and hence by variations in atmospheric humidity. Other similar woods may of course be used, lightness and resiliency being the essential characteristics. I have also found it desirable to paint the exposed face of the strip 5b to insure that moisture will not penetrate the surface of the wood.

The wood strip 5a has been cut crosswise of the grain from an open grain, non-pitchy wood, such as western hemlock or maple, so that the pores open through the strip from face to face and tend to absorb moisture quickly, thus cause the strip to expand and shrink in accordance with change in the humidity of the atmosphere. Thus variations in humidity will cause the wood strip 5a to expand or contract lineally and being closely joined to the strip 5b will cause the latter to change shape accordingly. In the use of the latter strips it is most desirable that the direction of the annual rings be substantially uniform throughout the length of the strip in order to avoid longitudinal twisting or warping.

Preferably, since it would be difficult to obtain a strip of substantial length in which the annual ring marks would be of uniform direction throughout, I have found it best to form the said strip in segments 5d, cut from the wood, as the block 5e, illustrated in Fig. 4, so as to provide a substantially continuous direction of annual rings.

The segments 5d are secured to the strip 5b in abutment and thus the expansion or contraction will be substantially lineal which, if the direction of annual rings were not continuous in the strip and tended to run off to the side would reduce the amount of lineal expansion and contraction.

In Figs. 6 to 9, inclusive, I have shown a modified form of hygrostatic bar adapted to be somewhat more sensitive in action, but compact in arrangement.

This form comprises sections 10, 11, 12, each similar to the bar 5, composed of thin strips of wood, 13, 14, joined together on their broad faces. The strips 13 are cut across the grain and composed of segments 13a, 13b, 13c, and the strips 14 are cut longitudinally of the grain, as before described with reference to Figs. 4 and 5.

Figures 8, 9:
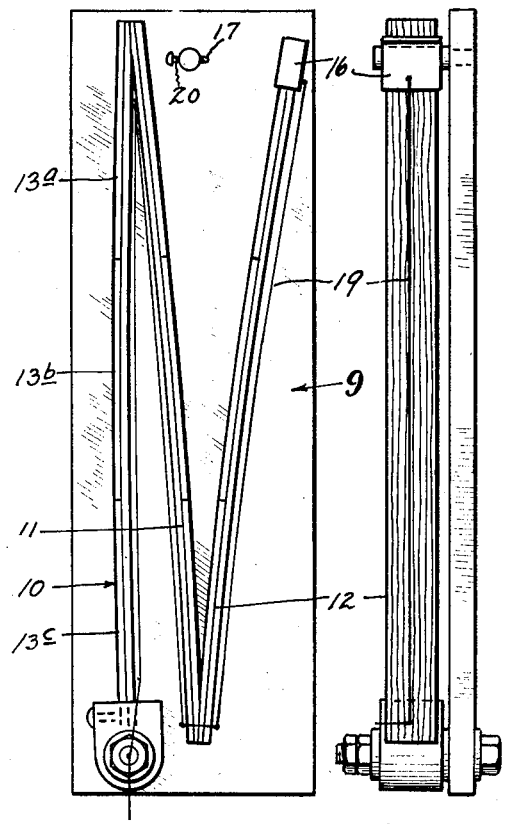
Fig. 8 shows a view taken similarly to Fig. 6 except that the sections are illustrated as curved under the affect of moisture.
Fig. 9 shows a side view of this modification taken in the direction of the arrow 9 of Fig. 8.

The sections 10, 11, 12 are arranged with the end grained strips 13 on alternate sides, Fig. 8 and are connected together at their ends making a Z-formation. The free end 10a of the section 10 is secured in a hub 15 similar to the hub 3 and the free end 12a of the section 12 is provided with a contact 16 adapted to cooperate with a contact 17 adapted to be connected in the circuit d of Fig. 10. The contact 16 is connected by a flexible conductor 19 with the other side of the circuit d. A set screw 20 is provided on the contact 17 by which the relative movement of the hygrostatic bar may be regulated.

Figure 11:
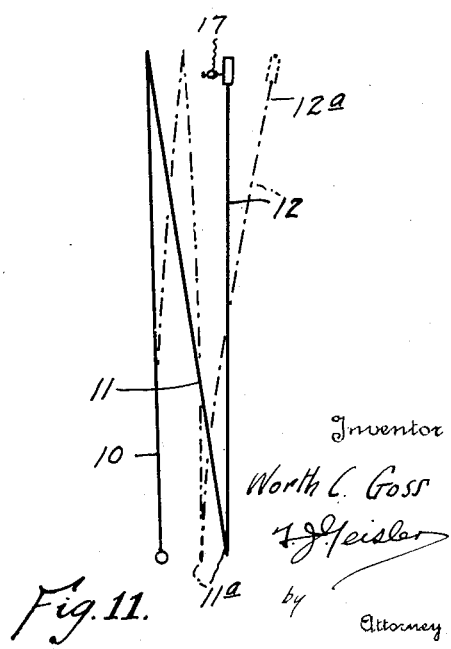
Fig. 11 shows diagrammatically the relative movements of the sections of my hygrostatic bar illustrated in Fig. 6.

By this construction, as illustrated by the broken lines in Fig. 11, an increase of moisture in the atmosphere will cause the strip 13 of the section 10 to expand and curve to the right, causing the end 11a of the section 11 to move to the left toward the hub 15 and similarly the expansion of the strip 13 of the section 11 will cause the strip 13 to curve to the left toward the hub 15 still further, which will move the end 12a of the section 12 away from the contact 17. The expansion of the strip 13 of section 12 will curve the end 12a still further away from the contact 17. Thus the sensitiveness of my hygrostatic bar is increased in that a slight change in humidity, affecting but a slight curvature of one section, is cumulated in the three sections and causes a substantial movement at the end of the section 12.

Figures 6, 7:
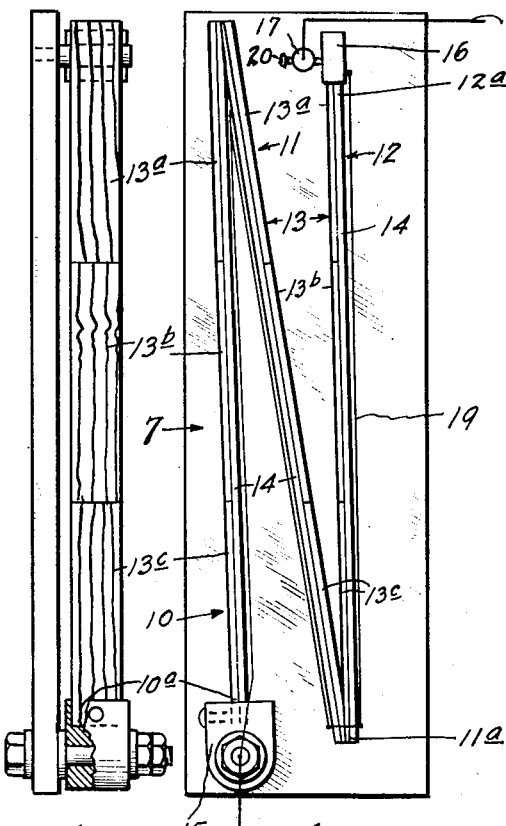
Fig. 6 shows a modified form of my hygrostatic bar composed of a series of sections connected at opposite ends in angular form.
Fig. 7 shows a view of this modification taken looking in the direction of the arrow 7 of Fig. 6.

In operation, referring to Fig. 10 in which I have shown the hygrostatic bar illustrated in Figs. 7 to 9, my humidizer having been located in a room or building in which it is desirable to maintain the humidity at a predetermined point, the hub 15 is adjusted so that the free end of the hygrostatic bar will hold the contact 16 on the contact 17, at a given percentage of humidity and at a given temperature, for example, 40 per cent at 72 degrees, a comfortable room condition of the atmosphere.

Thus, the circuit d will be closed and the electric heating element b energized, which will vaporize the water in the container a and maintain the said given percentage of humidity.

But should the humidity rise because of the water vapor thrown off by the container, the strips 13 will absorb more moisture from the atmosphere and expand causing the hygrostatic bar to curve away from the contact 17, thus breaking the circuit d and stopping the giving off of vapor from the container.

The degree of movement necessary to cause the making and breaking of the circuit d is adjustable by means of the set screws carried by the stationary contacts, but it should be noted that for convenience of illustration the relative movements of the hygrostatic bar have been exaggerated in the drawings.

The bar 5 will remain in this position until the humidity has again dropped to 40 per cent when the strip 5a will become relatively drier and contract, causing the contact 16 to be brought again into contact with the contact 17 to complete the circuit $d$ and energize the heating element $c$.

Similarly, fluctuations in the temperature affecting the relative humidity of the room will have the same affect as before described. For example, 40 per cent humidity at 72 degrees, will fall with a rise in temperature, and the reverse, but any change in the percentage of humidity will cause the strips 13 to expand or contract and thus throw more water vapor into the atmosphere or shut off the supply, as the actual moisture content or humidity in the room varies.

I claim:

1. In a hygrostatic instrument, a humidity sensitive element comprising two complemental co-extensive strips of flexible material disposed face to face with their contacting surfaces joined throughout the effective length of the element, one of said strips being resilient and relatively non-hygroscopic and the other strip being flexible hygroscopic and porous with the pores thereof opening through the strip from face to face.

2. In a hygrostatic instrument, a humidity sensitive element comprising complemental backing and facing strips of material secured permanently together throughout their effective lengths; said backing strip being a longitudinally grained resilient strip of wood adapted to be bent laterally in opposite directions by reason of expansion or contraction of the facing strip; said facing strip being an end grain section of wood with the pores thereof opening directly through the strip from face to face.

3. In a hygrostatic instrument, a humidity sensitive element comprising a bar fixedly mounted at one end and adapted to move at its opposite end in accordance with changes of humidity; said bar comprising complemental backing and facing strips of material secured permanently together throughout their effective lengths; said backing strip being a longitudinally grained resilient strip of wood and said facing strip being an end grain section of wood with the pores thereof opening directly through the strip from face to face and of such thinness as to be substantially uniformly affected throughout by changes of humidity.

4. A device as in claim 3 wherein the facing strip is composed of a plurality of sections in end to end relationship with the annual rings extending in a substantially uniform direction.

5. A humidity sensitive element comprising two flat strips of material joined face to face throughout the length of the element; the first of said strips being relatively non-hygroscopic and flexible and the second strip being a wooden hygroscopic strip with the direction of grain perpendicular to the face of the first strip.

WORTH C. GOSS.